P. ODA.
THRESHING MACHINE OR THE LIKE.
APPLICATION FILED MAY 5, 1920.

1,374,518.

Patented Apr. 12, 1921.
2 SHEETS—SHEET 1.

INVENTOR.
PETER ODA.
BY
ATTORNEY.

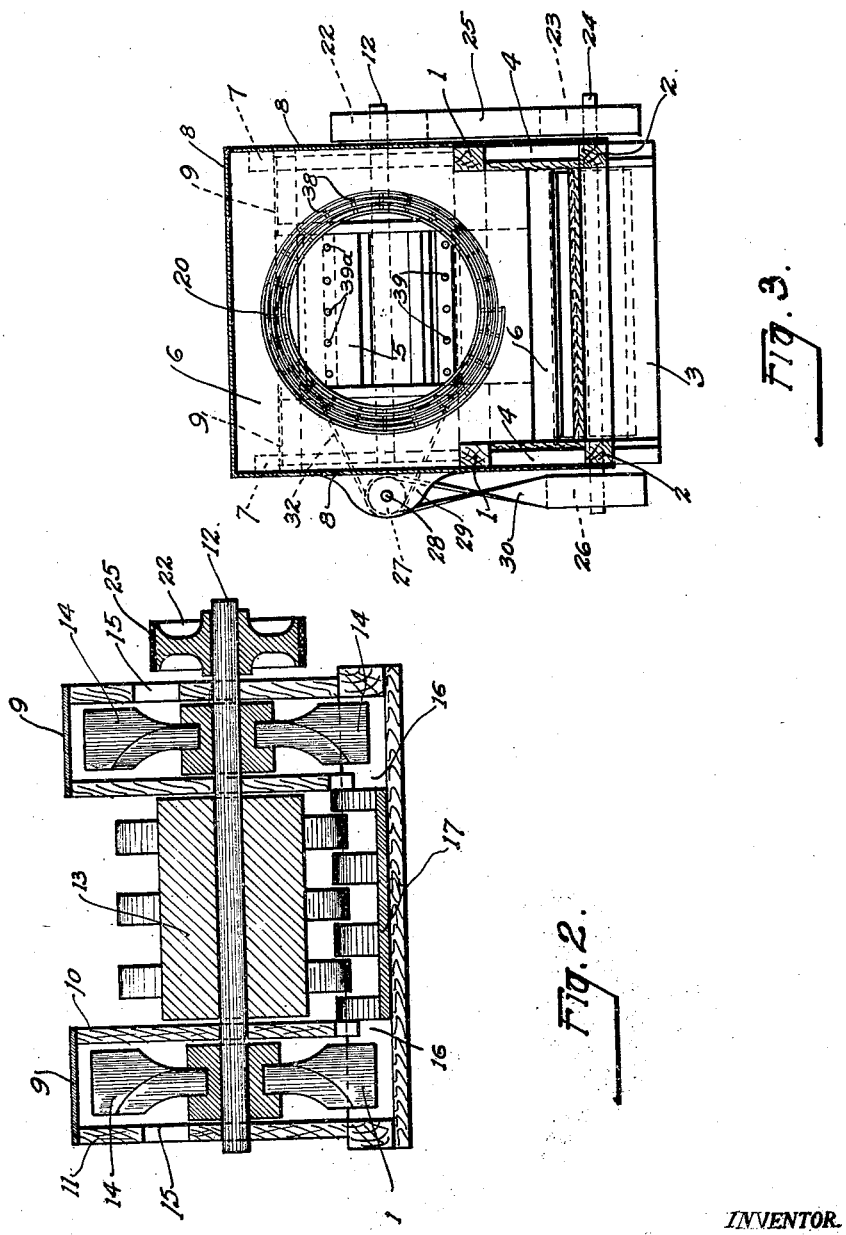

UNITED STATES PATENT OFFICE.

PETER ODA, OF ARCANUM, OHIO.

THRESHING-MACHINE OR THE LIKE.

1,374,518.　　　　　Specification of Letters Patent.　　Patented Apr. 12, 1921.

Application filed May 5, 1920. Serial No. 379,089.

*To all whom it may concern:*

Be it known that I, PETER ODA, a citizen of the United States, residing at Arcanum, in the county of Darke and State of Ohio, have invented certain new and useful Improvements in Threshing-Machines or the like, of which the following is a specification, reference being had therein to the accompanying drawings.

This invention relates to threshing machines, and has for its particular object to provide a combined threshing machine and grain separator which will be of improved construction and more effective in operation than threshing machines, of ordinary types.

It is an object of the invention to provide a construction in which operating vibration and the general wear-and-tear of the machinery will be minimized. Thus the machine as a whole will be stabilized when operated, more effective threshing and separation of the grain from the straw will be obtained, and the life of the machine will be accordingly prolonged.

The improved thresher is of the rotary type, but is a marked improvement with respect to certain of its novel features over present well known rotary threshers.

A common defect in rotary threshers so far introduced on the market consists in failure to properly combine the air apparatus with the threshing and separating mechanism with the result that effective threshing is rendered impossible. In certain constructions the air blast is introduced too late, or too remote from the threshing cylinder, and is not properly distributed over the straw as it passes from the cylinder into and through the grain separator. In other constructions no provision is made to regulate the air blast according to the character of the grain to be threshed or the speed at which the machine is to be operated, except by constant manual manipulation of the regulating mechanism of the air apparatus.

These defects, which are well known to all practical threshers, I have in some respects eliminated, and in other respects materially improved by the provisions of the present invention, my knowledge of the art having been acquired by twenty years' experience as a practical thresher.

In the drawings:

Fig. 2 is a cross sectional view taken on the line 2—2 of Fig. 1, and

Fig. 3 is a cross sectional view taken on the line 3—3 of Fig. 1.

Figure 1:
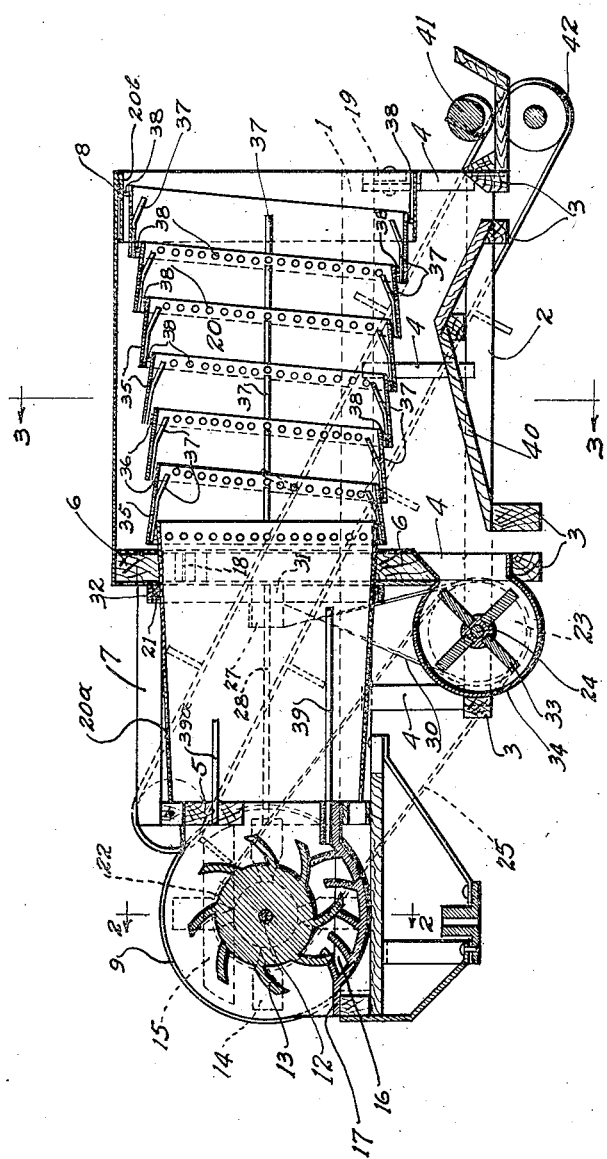
Figure 1 is a vertical, longitudinal sectional view taken substantially through the center of the machine.

The threshing and grain separating mechanism, as here shown to illustrate the invention, may be supported in any suitable frame, such as the frame comprised of the upper and lower longitudinal members 1—2, cross frame members 3, vertical supports 4, and an upper frame structure comprising front and rear cross-heads 5—6, and longitudinal tie rails 7 which serve to brace the upper frame and to secure one crosshead to the other.

The frame and operable mechanism supported therein may be inclosed by any suitable structure, such as the machine casing 8, and the apparatus as a whole may be mounted in the usual manner on a suitable wheeled truck to provide for transporting the machine.

At the front of the machine, supported on the opposite longitudinal frame members 1—2 and the front cross frame member 3, are two opposite circular-shaped housings 9, in the inner and outer walls 10—11 of which the shaft 12 has its bearings, the cylinder 13 being secured to shaft 12 between the housings 9. Within each housing 9, and secured to shaft 12 is a blower fan 14, each housing having an air intake port 15 in its outer wall and an exhaust port 16 in the lower portion of its inner wall opening into the cylinder casing 17.

Mounted to rotate on roller bearings 18 supported in cross-head 6, and having its rear end rotatably supported on rollers 19 secured to the rear vertical supports 4 of the machine frame, is a cone-shaped grain separating drum 20; the drum having a belt band 21 provided on its periphery whereby operative movement may be imparted thereto. The operating connections consisting, as here shown, of a belt pulley 22 secured to the outwardly projecting end of the cylinder shaft 12; a pulley 23 secured to a shaft 24 supported in bearings on the lower longitudinal frame members 2 and a belt 25 connecting the two pulleys; a second pulley 26 secured to shaft 24, a pulley 27 secured to a shaft 28 supported in bearings 29 on the cross-heads 5—6 and a belt 30 connecting the two pulleys; and a second pulley 31 secured to shaft 28 and a belt 32 connecting the pulley to the belt band 21 of the drum 20.

Thus operation of the grain separating drum and also of the blowers 14 will be timed with the cylinder 13, all the movements being rotatable and well balanced one against the other to stabilize their operation. To insure effective belting of the apparatus, the belt and pulley arrangement above described is preferably applied on both sides of the machine, the belt band 21 for such an arrangement being made wide enough for two belts connected thereto from opposite sides of the machine.

A cleaning fan 33 inclosed in a casing 34 is secured to shaft 24, being thus also directly connected to the cylinder shaft 12 and, therefore, timed to the speed of the cylinder and forming part of the main rotatable operating unit.

The grain separator, as here shown, consists of the cone-shaped, spirally-wound, rotatable drum 20, which is inclined outwardly from its front end adjacent the cylinder and has open spaces or interstices 36 arranged relative to the overlapping spiral coil or involutions 35, through which separation of the grain from the straw as the same pass through the drum will be effected, the coil being forwardly and outwardly inclined relative to the center of rotation of the drum so that the grain will readily move by gravity over the inner surface of the coil on the bottom of the drum through the spaces 36 in the inverse direction to the movement of the straw through the drum. Only that part of the drum extending beyond the cross-head 6 is provided with the coil 35, the portion of the drum extending between the cross-heads 5—6 having a closed conical-shaped wall 20$^a$; thus all the grain and straw delivered from the cylinder will be carried through the front section of the drum into the spiral section when separation of the grain from the straw will be effected. The discharge end of the drum is formed of a straight-edge, circular band 20$^b$ so that discharge of the straw and tailings as the drum rotates will be in the same plane.

To render the action of the separator on the straw more pronounced, whereby to accomplish complete separation of the grain from the straw, the interior of the spiral portion of the drum is provided with a plurality of inwardly and forwardly projecting spring prongs 37 which engage the straw and tend to carry it upwardly with the rotation of the drum, thus imparting a tumbling movement to the straw and acting to effectually shake the grain therefrom, the grain gravitating to the bottom of the drum and escaping through the spaces 36 as above described. Pins 38 are interposed between the overlapping edges of the coil 35, extending vertically through the spaces 36, to divide the space into a series of graduated apertures which permit the grain to freely pass therethrough into the cleaning fan, but act to exclude foreign matter coarser than the grain therefrom.

The grain to be threshed may be delivered to the cylinder 13 in any suitable manner, the common practice being to use automatic feeders as distinguished from the former practice of hand feeding. The cylinder acts to release the grain from the pods, the grain together with the straw then being discharged into the open end of the drum section 20$^a$, the movement of the straw being aided by fixed guide bars 39 which are secured in the frame of the machine and extend a considerable distance into the drum end 20$^a$, thus acting to support the straw and effecting a better action of the air blast thereon as it enters the separator drum.

To further develop the desired movement of the straw the air blast from the blowers 14 is directed against the straw from beneath as it leaves the cylinder, the air being discharged into the cylinder casing through the ports 16 of the opposite blower housings 9, thus acting to lift the straw and to blow it into and through the separator drum, separation of the grain from the straw being effected in the manner described as it passes therethrough to the discharge end of the separator.

The grain from the separator moves by gravity over an inclined guide 40 into the cleaning fan 33 and is thence discharged from the machine in the usual manner. The tailings from the separator, consisting in most part of light grain not released from the pods, and a very small per cent. of good grain, discharged at the rear end of the separator drum, is returned to the cylinder by a screw conveyer 41 arranged transversely to the separator, and coöperating with an elevator 42 which receives the tailings from the conveyer and delivers the same into the cylinder casing to be run a second time through the machine.

The straw as it leaves the separator may be discharged from the machine in any suitable manner, as with the use of the usual type of straw blower used in connection with threshing machines.

From the foregoing detailed description, the construction and operation of my improved thresher will be understood by those experienced in the operation of machines of this character. I am well aware, of course, that various types of rotary threshers have been used heretofore, but in all previous constructions, as far as I have knowledge, and experience in their operation, such machines have had certain well known defects, especially with respect to the movement of the straw through the separator and effective separation of the grain from the straw, which the present invention will correct or materially improve.

Having thus fully described my invention, what I claim and desire to secure by Letters Patent is:

1. In a threshing machine the combination with a threshing cylinder, of a longitudinally disposed, rotatable separator coöperating with the cylinder to receive the threshed grain and straw therefrom, and blowers arranged at the opposite ends of the cylinder and adapted to directly discharge equal blasts into the cylinder casing against the straw as it passes from the cylinder into the separator.

2. In a threshing machine the combination with a threshing cylinder, of a rotatable separator coöperating with the cylinder to receive the threshed grain and straw therefrom, and a blower arranged relative to the cylinder and adapted to directly discharge a blast against the straw from beneath as it passes into the separator.

3. In a threshing machine the combination with a threshing cylinder, of a rotatable separator coöperating with the cylinder to receive the threshed grain and straw therefrom, and a plurality of blowers operatively connected with the cylinder and adapted to directly discharge equal blasts against the straw from beneath as it passes through the cylinder into the separator.

4. In a threshing machine the combination with a threshing cylinder, and of a cone-shaped, spirally-formed, rotatable separator drum coöperating with the cylinder to receive the threshed grain and straw therefrom, and having open spaces arranged relative to said spiral whereby separation of the grain from the straw will be effected.

5. In a threshing machine the combination with a threshing cylinder, and of a cone-shaped, rotatable separator drum having a closed wall section coöperating with the cylinder to receive the threshed grain and straw therefrom, and a spirally-formed section having open spaces formed relative to said spiral whereby separation of the grain from the straw will be effected.

6. In a threshing machine the combination with a threshing cylinder, and of a cone-shaped, rotatable separator drum coöperating with the cylinder to receive the threshed grain and straw therefrom, and having a spirally-formed portion with graduated open spaces arranged relative to said spiral whereby separation of the grain from the straw and elimination of foreign matter from the grain will be effected.

7. In a threshing machine the combination with a threshing cylinder, of a spirally-formed, rotatable separator drum coöperating with the cylinder to receive the threshed grain and straw therefrom, said spiral being outwardly and rearwardly inclined from the center of rotation of the drum, and having open spaces arranged relative thereto whereby separation of the grain from the straw will be effected.

8. In a threshing machine the combination with a threshing cylinder, of a spirally-formed rotatable separator drum coöperating with the cylinder to receive the threshed grain and straw therefrom, said spiral having overlapping edges and open spaces arranged relative thereto whereby separation of the grain from the straw will be effected.

9. In a threshing machine the combination with a threshing cylinder, and of a cone-shaped, rotatable separator drum coöperating with the cylinder to receive the threshed grain and straw therefrom, and having closed peripheral walls at its opposite ends, and a spirally-formed, open wall intermediate its ends, whereby separation of the grain from the straw will be effected.

10. In a threshing machine the combination with a threshing cylinder, and of a rotatable separator drum coöperating with the cylinder to receive the threshed grain and straw therefrom and having a plurality of overlapping involutions arranged in its peripheral wall with open spaces arranged relative thereto, whereby separation of the grain from the straw will be effected.

11. In a threshing machine the combination with a threshing cylinder, of a blower coöperating with the cylinder and acting to direct a blast against the straw as it passes from the cylinder, and a rotatable separator drum having closed and open peripheral wall sections and coöperating with the cylinder to receive the threshed grain and straw therefrom, supporting guides for the straw extending from the cylinder into said closed wall section, and devices within said open wall section adapted to engage the straw to agitate the same as the drum is rotated whereby separation of the grain from the straw is effected.

12. In a threshing machine the combination with a threshing cylinder, of a separator coöperating with the cylinder to receive the threshed grain and straw therefrom, blowers arranged at the opposite ends of the cylinder and adapted to directly discharge equal blasts against the straw as it passes into the separator, and means connecting the separator and said blowers with the cylinder actuating mechanism.

In testimony whereof, I affix my signature.

PETER ODA.